United States Patent [19]

Brown

[11] Patent Number: 5,692,541
[45] Date of Patent: Dec. 2, 1997

[54] HYDRAULIC JOYSTICK

[75] Inventor: David J. Brown, North Yorkshire, United Kingdom

[73] Assignee: Caterpillar Inc., Peoria, Ill.

[21] Appl. No.: 640,309

[22] Filed: Apr. 30, 1996

[51] Int. Cl.[6] .................................................. F16K 11/18
[52] U.S. Cl. ........................ 137/636.2; 137/636.1; 137/636.3; 74/471 R; 74/471 XY; 91/522; 91/523
[58] Field of Search ................... 74/471 R, 471 XY; 137/636, 636.2, 636.3, 636.1; 91/521, 522, 523

[56] References Cited

U.S. PATENT DOCUMENTS

| | | | |
|---|---|---|---|
| 3,131,574 | 5/1964 | Clingerman | 137/636 |
| 3,589,242 | 6/1971 | Peterson et al. | 137/636 |
| 3,700,044 | 10/1972 | Berg | 137/636.2 |
| 3,766,944 | 10/1973 | Distler | 137/636.2 |
| 3,897,805 | 8/1975 | Casey | 137/636.2 |
| 4,067,546 | 1/1978 | Matsuda et al. | 137/636 |
| 4,098,286 | 7/1978 | Prime | 137/636.2 |
| 4,133,251 | 1/1979 | Agge et al. | 137/636.2 |
| 4,187,737 | 2/1980 | Mori et al. | 74/471 |
| 4,213,484 | 7/1980 | Habiger | 137/636.2 |
| 4,421,135 | 12/1983 | Harshman et al. | 137/636.2 |
| 4,469,007 | 9/1984 | Melocik | 137/636.2 |
| 4,863,337 | 9/1989 | Ishiguro et al. | 137/636.2 |
| 4,938,091 | 7/1990 | Waggoner et al. | 74/471 |
| 4,978,273 | 12/1990 | Radke et al. | 414/697 |
| 5,209,263 | 5/1993 | Hori | 137/636.2 |
| 5,232,057 | 8/1993 | Renard | 172/812 |
| 5,277,258 | 1/1994 | O'Dell | 172/812 |
| 5,288,198 | 2/1994 | Mozingo | 414/685 |

Primary Examiner—George L. Walton
Attorney, Agent, or Firm—Claude F. White; Diana L. Charlton

[57] ABSTRACT

The present invention includes a single joystick for the simultaneous control of three spool valves for use on a construction machine. A first portion of the joystick is moved in a first direction which causes a cam to selectively depress a first pair of plungers to control the first spool valve. Movement of the first portion in the second direction causes the cam to selectively depress a second pair of plungers thereby controlling the movement of the second spool valve. A handle of a second portion of the joystick rotates about an axis causing a plate to rotate in a corresponding manner. The corresponding rotation of the plate causes a link member to rotate about the axis causing a pair of lugs to selectively depress a third pair of plungers to control the third spool valve. The mechanism for depressing the third plungers works independently of the position of the first portion so that the control of the third spool valve is independent of the control of the first and second spool valves.

9 Claims, 5 Drawing Sheets

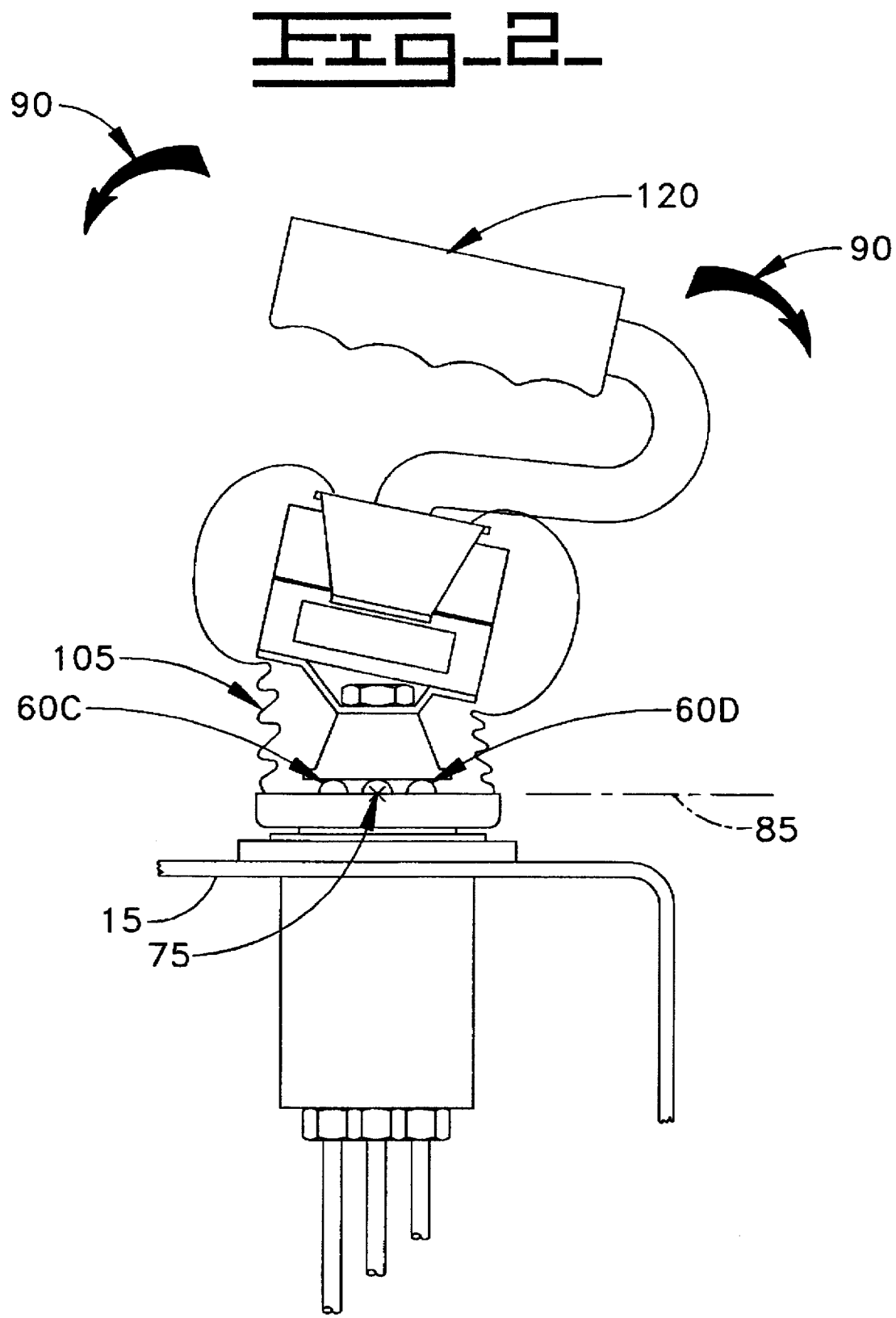

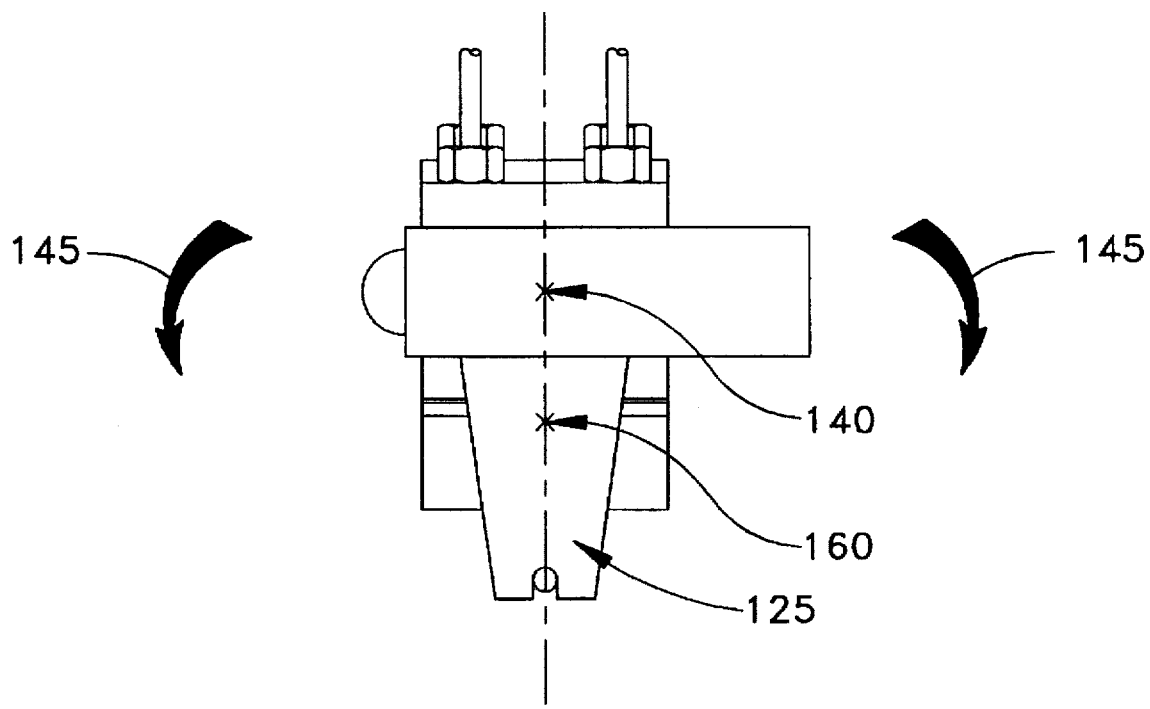

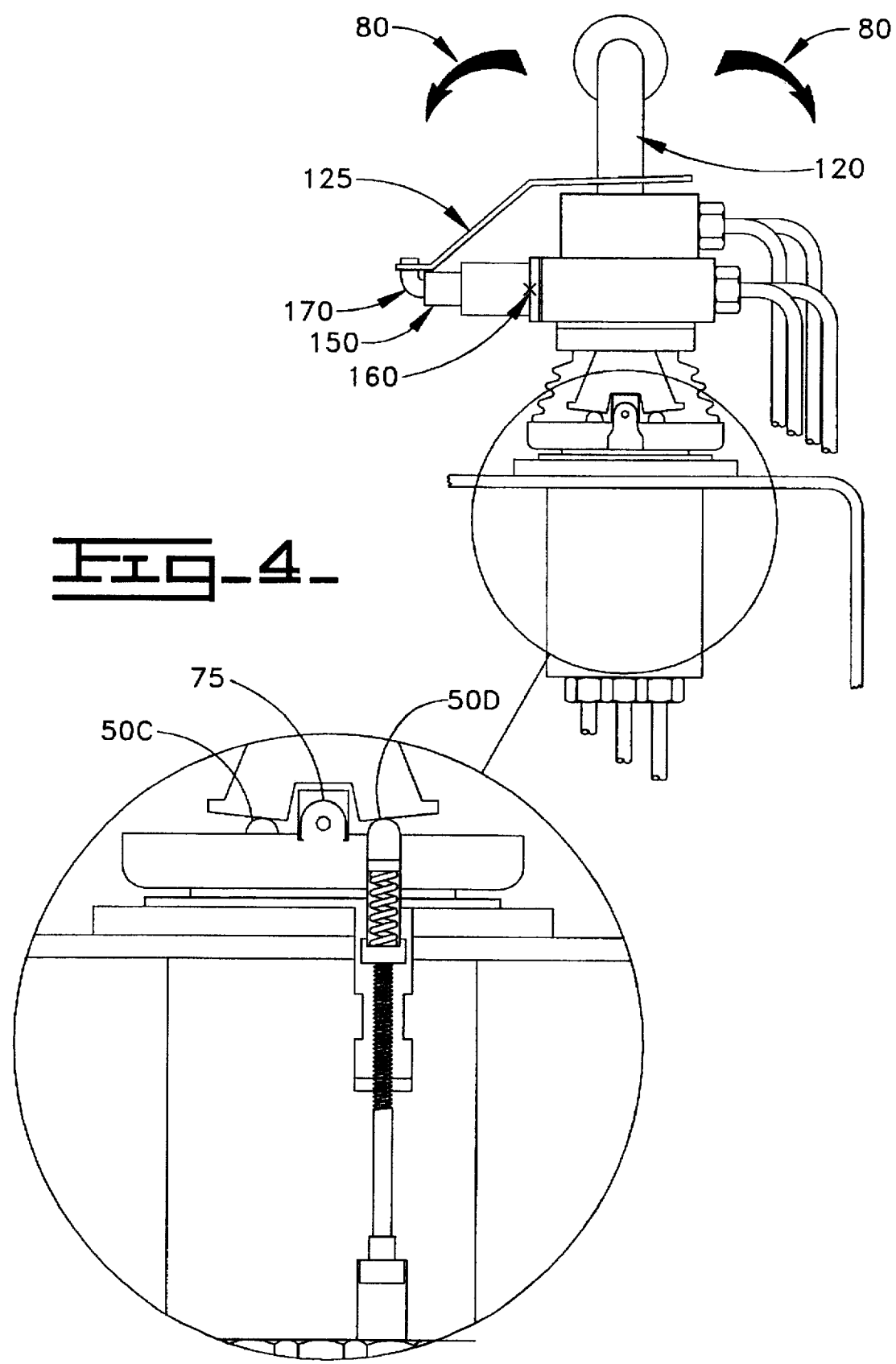
Fig_4

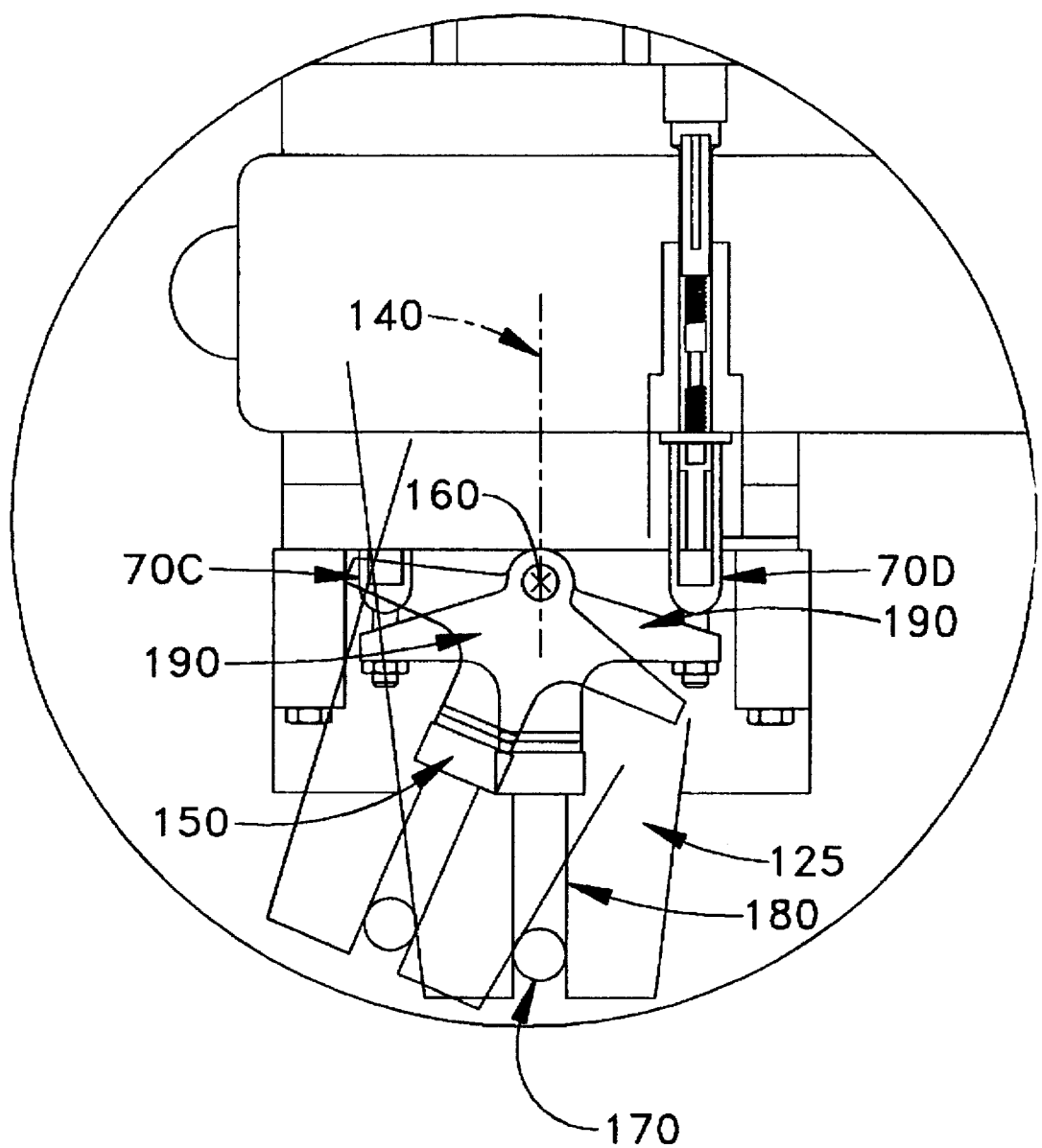
Fig_5_

HYDRAULIC JOYSTICK

TECHNICAL FIELD

This invention relates generally to hydraulic joysticks and more particularly to the use of a single hydraulic joystick capable of controlling three hydraulic valve spools.

BACKGROUND ART

Joysticks for construction machines and the like are known in which the single lever can proportionally control any two hydraulic spool valves. Normally, however, in order to control a third spool valve, it is necessary to activate an electrically operated change-over valve to redirect the hydraulic signal from the joystick from one of the two spool valves to a third spool valve. Optimization of machine performance is achieved by controlling proportionally three spool valves simultaneously. The simultaneous control of the three spool valves has been accomplished through the use of proportional electric switches in the joystick with computer control and solenoid operation. Unfortunately, this control has proven to be costly and unreliable.

The present invention is directed to overcoming the problems as set forth above.

DISCLOSURE OF THE INVENTION

In one aspect of the present invention, a hydraulic pilot joystick is disclosed for controlling three hydraulic spool valves. The joystick includes a first portion for controlling two of the spool valves. The first portion being pivotable about first and second axes. Movement about each axes in one direction or the other displaces a respective plunger which is arranged to transmit a hydraulic signal to a respective end of a respective spool valve to displace the spool valve proportionately to the displacement of the joystick. A second portion is used for controlling the third spool valve independent of the position of the first portion. The second portion being pivotally connected to the first portion so as to be pivotable about a third axis. Movement of the second portion about the third axis in one direction or the other displaces a respective plunger which is arranged to transmit a hydraulic signal to a respective end of the third spool valve to displace that spool valve proportionately to the displacement of the joystick.

The present invention includes a single joystick for controlling three hydraulic spool valves simultaneously for increased performance of a machine with high reliability and at low costs.

BRIEF DESCRIPTION OF THE DRAWINGS

FIG. 2 is a diagrammatic side view of the joystick;

FIG. 3 is a top view of the joystick;

FIG. 4 is similar to FIG. 1 with a detail shown in cross section; and

FIG. 5 is a diagrammatic view showing a detail of the arrangement shown in FIG. 3.

BEST MODE FOR CARRYING OUT THE INVENTION

Figure 1:
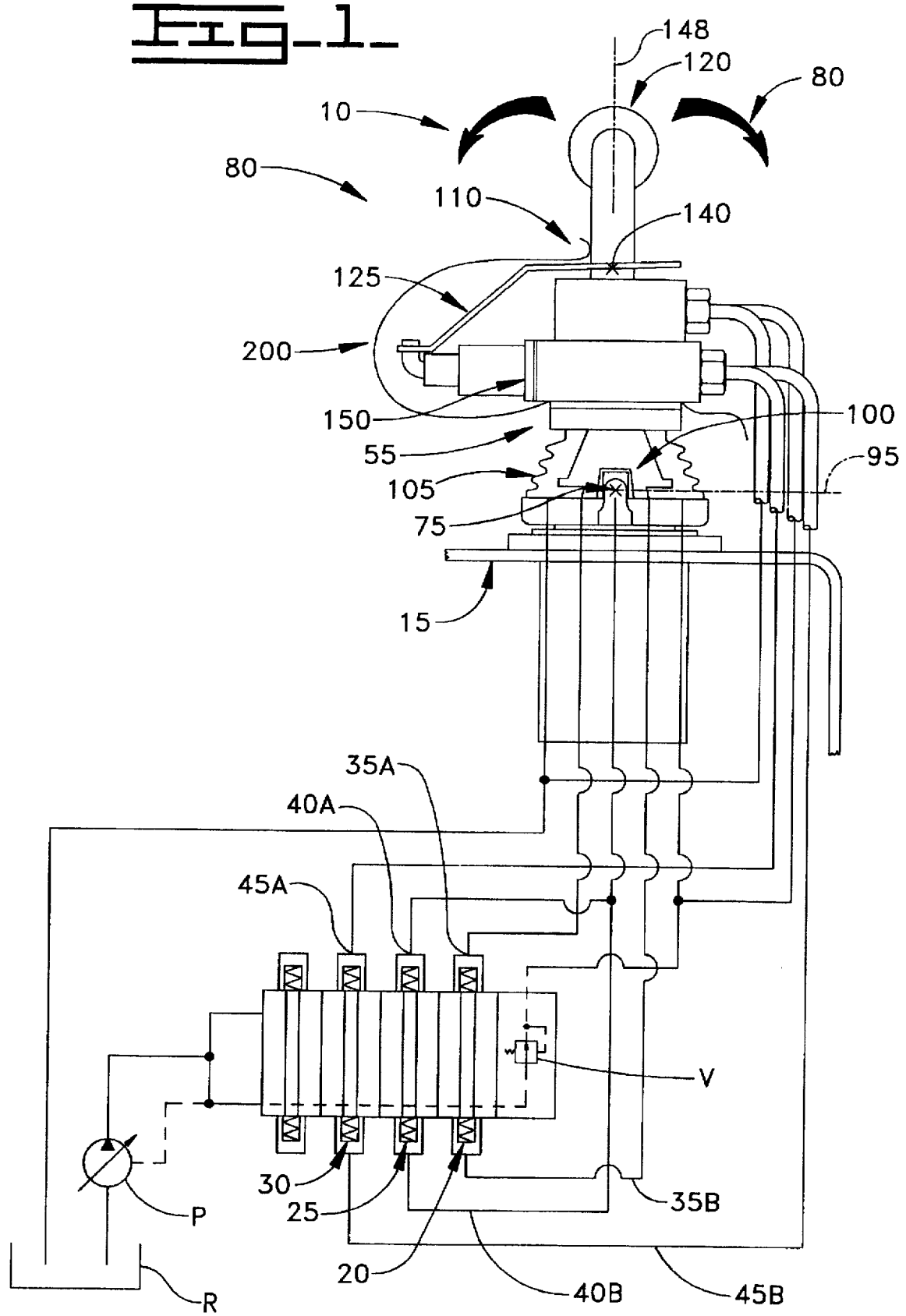
FIG. 1 is a diagrammatic end view of a joystick showing a hydraulic circuit.

A joystick 10 is shown mounted on a bracket 15 in a cab (not shown) of a construction machine (not shown). A first 20, second 25 and third spool valve 30 is operatively associated with the joystick 10. Each of the spool valves 20,25,30 are connected to the joystick 10 through a respective pair of hydraulic line 35A, 35B, 40A, 40B, 45A, 45B. A variable displacement pump P is fluidly connected to the hydraulic lines 35A, 35B, 40A, 40B, 45A, 45B to transmit fluid therethrough from a reservoir R. A pressure reducing valve, one of which is shown at V, is disposed within each hydraulic line 35A, 35B, 40A, 40B, 45A, 45B, respectively.

The hydraulic lines 35A, 35B of the first spool 20 terminate at a first pair of plungers 50C, 50D as shown in FIG. 4, which face a first portion 55 of the joystick 10. The hydraulic lines 40A, 40B of the second spool 25 terminate at a second pair of plungers 60C, 60D as shown in FIG. 2 which also face the first portion 55 of the joystick 10. The hydraulic lines 45A, 45B of the third spool 30 terminate at a third pair of plungers 70C, 70D as shown in FIG. 5.

The first portion 55 is pivotable about a first pivot point 75 along an axis so as to be pivotable in a first direction as shown by arrows 80 in FIGS. 1 and 4 to define a first pivotal axis 85. The first portion is also pivotable about the first pivot point 75 along the axis in a second direction shown by arrows 90 in FIG. 2 to define a second pivotal axis 95. The second pivotal axis 95 is perpendicular to the first pivotal axis 85. It should be understood that the first and second axes 85, 95 may be spaced apart. However, for a more compact and less complex structure, the first and second axes 85, 95 may intersect so that the first portion 55 is pivotable about the point of intersection.

The first portion includes a cam portion 100 at its lower end which is connected to the first and second plungers 50C, 50D, 60C, 60D. A flexible bellows 105 surrounds the cam portion 100. The plungers 70C, 70D for the third spool valve 30 are disposed within the body of the first portion 55 above the cam portion as shown in FIG. 5.

The plungers 70C, 70D are operatively associated with a second portion 110 which has a handle 120 which can be gripped by an operator and a laterally and downwardly extending plate 125 rigidly fixed to the handle 120. The second portion 110 is pivotably connected to the first portion 55 and is rotatable about an axis passing through a second pivot point 140 so as to be rotatable in a direction shown by arrows 145 to define a rotational axis 148. The second pivot point 140 is substantially vertical when the joystick 10 is in its rest position. It is preferable that the first and second pivotal axes 85, 95 and the rotational axis 148 are substantially mutually perpendicular. The rotational axis 148 may also pass through the point of intersection between the first and second axes 85, 95.

The first 55 and second 110 portions are additionally coupled by a link member 150 which is pivotally connected at one end to the first portion 55 so as to pivot about an axis passing through a third pivot point 160 which is always parallel to the axis passing through the second pivot point 140 even when the joystick is tilted. The other end of the link member 150 terminates in an upwardly bent portion 170 which is slidably retained in a slot 180 in the plate 125. The link member 150 also has a pair of oppositely protruding lugs 190 which face the third plungers 70C, 70D.

The portion of the joystick 10 below the handle 120 and above the bellow 105 is covered with a flexible cover 200.

Industrial Applicability

In operation, the joystick 10 may be used on any construction machine with a raisable telescopic boom with an adjustable tool at one end. One of the spool valves can be used to control the telescoping of the boom, one can be used to control the raising and lowering of the boom and one can be used to control the attitude of the tool.

The joystick 10 controls the movement of the first 20, second 25 and third 30 spools. The hydraulic lines 35A, 35B, 40A, 40B, 45A, 45B allows the spools 20, 25, 30, respectively, to move in opposing directions. The pressure reducing valve V will open if the pressure in any of the hydraulic lines 35A, 35B, 40A, 40B, 45A, 45B drops below a predetermined threshold value.

The first portion 55 is capable of proportionately controlling the positions of the first 20 and second 25 spools. This is accomplished by moving the first portion 55 in the first direction which causes the cam 100 to selectively depress the first plungers 50C, 50D thereby controlling the movement of the first spool 20. Movement of the first portion 55 in the second direction causes the cam 100 to selectively depress the second plungers 60C, 60D thereby controlling the movement of the second spool 25. In this way, the first portion 55 operates similar to a conventional four-way hydraulic pilot.

The handle 120 of the second portion 110 rotates about the axis 148 passing through the pivot point 14, in the direction of the arrows 145 in FIG. 3 causing the plate 125 to rotate in a corresponding manner. The corresponding rotation of the plate 125 causes the link member 150 to rotate about the axis passing through the third pivot point 160 as the upwardly bent portion 170 slides along the slot 180. The rotation of the link member 150 causes the lugs 190 to selectively depress the third plungers 70C, 70D. The mechanism for depressing the third plungers 70C, 70D works independently of the position of the first portion 55 so that the control of the third spool is independent of the control of the first and second spools 20, 25. In all other respects, the first and second portions 55, 110 are constrained to move together so that movement of the handle 120 in the direction of the arrows 80 causes a proportional movement of the first spool 20 as described above, while the movement of the handle 120 in the direction of the arrows 90 causes a proportional movement of the second spool 25.

The flexible bellows 105 and the flexible cover 200 are provided to protect the inside of the joystick mechanism 10 from being contaminated with dirt.

In view of the above, the use of a single joystick for controlling three hydraulic spool valves simultaneously increases performance of a machine with high reliability and at low costs.

I claim:

1. A hydraulic joystick for controlling three hydraulic spool valves, comprising:

a first portion for controlling two of the spool valves, the first portion being pivotable about first and second axes, whereby movement about each axes in a first direction and a second direction opposite the first direction displaces a respective plunger which is arranged to transmit a hydraulic signal to a respective end of a respective spool valve to displace the spool valve proportionately to the displacement of the joystick; and a second portion pivotally connected to and operatively associated with the first portion for movement therewith about the first and second axes for controlling the two spool valves, the second portion controlling the third spool valve and being rotatable about a third axis independent of the position and movement of the first portion, whereby movement about the third axis in a first direction and a second direction opposite the first direction displaces a respective plunger which is arranged to transmit a hydraulic signal to a respective end of the third spool valve to displace the spool valve proportionately to the displacement of the joystick.

2. The joystick according to claim 1, wherein the three axes are substantially mutually perpendicular.

3. The joystick according to claim 2, wherein the second portion is provided with a handle to be gripped by an operator, and is constrained to move with the first portion in all ways other than the rotational movement about the third axis.

4. The joystick according to claim 3, wherein the first and second axes intersect so that the first portion is pivotable about the point of intersection.

5. The joystick according to claim 4, wherein the third axis also passes through the point of intersection.

6. The joystick according to claim 5, wherein the plungers for the third spool valve are situated in the first portion.

7. The joystick according to claim 6, wherein the first and second portions are connected by a link which is pivotally connected to the first portion and is slidably retained by the second portion, so that rotation of the second portion about its pivot axis causes rotation of the link about its pivot axis thereby causing the link to abut against one or other of the plungers of the third spool valve.

8. The joystick according to claim 7, including that each of the three spool valves are operatively associated with two hydraulic lines which extend from opposite ends of the respective spool valve to a respective plunger and contain hydraulic fluid at a constant pressure so that displacement of a respective plunger is transmitted via the fluid to cause a corresponding displacement of the associated spool valve, wherein movement of the first portion about the first axis displaces a first pair of plungers to move a first spool valve by a proportionate amount in a first direction and a second direction opposite the first direction, movement of the first portion about the second axis displaces a second pair of plungers to move a second spool valve by a proportionate amount in a first direction and a second direction opposite the first direction, and movement of the second portion about the third axis displaces a third pair of plungers to move a third spool valve by a proportionate amount in a first direction and a second direction opposite the first direction.

9. The joystick according to claim 8, wherein the pressure of the hydraulic fluid in each hydraulic line is maintained by a pump which pumps fluid from a reservoir through a pressure reducing valve when the pressure in a line drops below a threshold value.

\* \* \* \* \*